(12) United States Patent
Davis (10) Patent No.: US 7,752,918 B2
(45) Date of Patent: Jul. 13, 2010

(54) APPARATUS AND METHOD FOR MEASURING A FLUID FLOW PARAMETER WITHIN AN INTERNAL PASSAGE OF AN ELONGATED BODY

(75) Inventor: Michael A. Davis, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 104 days.

(21) Appl. No.: 11/937,003

(22) Filed: Nov. 8, 2007

(65) Prior Publication Data

US 2008/0173100 A1 Jul. 24, 2008

Related U.S. Application Data

(60) Provisional application No. 60/858,323, filed on Nov. 9, 2006.

(51) Int. Cl.
*G01F 1/20* (2006.01)
*G01F 1/66* (2006.01)

(52) U.S. Cl. .................. 73/861.28; 73/861.18

(58) Field of Classification Search .. 73/861.25–861.31
See application file for complete search history.

(56) References Cited

U.S. PATENT DOCUMENTS

| | | | |
|---|---|---|---|
| 2,874,568 | A | 12/1955 | Petermann |
| 3,715,709 | A | 2/1973 | Zacharias et al. |
| 3,751,979 | A | 8/1973 | Ims |
| 3,781,895 | A | 12/1973 | Monser |
| 3,851,521 | A | 12/1974 | Ottenstein |
| 3,885,432 | A | 5/1975 | Herzl |
| RE28,686 | E * | 1/1976 | Coulthard ................ 73/861.6 |
| 3,952,578 | A | 4/1976 | Jacobs |
| 3,987,674 | A * | 10/1976 | Baumoel ................ 73/861.28 |
| 4,004,461 | A | 1/1977 | Lynworth |
| 4,032,259 | A | 6/1977 | Brown |

(Continued)

FOREIGN PATENT DOCUMENTS

DE 4306119 9/1994

(Continued)

OTHER PUBLICATIONS

Sonar-Based Volumetric Flow Meter for Pulp and Paper Applications—Daniel L. Gysling & Douglas H. Loose— Dec. 13, 2003.

(Continued)

*Primary Examiner*—Lisa M Caputo
*Assistant Examiner*—Jonathan Dunlap (57) ABSTRACT

A method and apparatus for measuring at least one parameter of a fluid flowing through an internal passage of an elongated body is provided. The internal passage is disposed between a first wall and a second wall, and the first wall and the second wall each include an interior surface and an exterior surface. The method includes the steps of providing an array of at least two ultrasonic sensor units, operating the sensor units to transmit ultrasonic signals at one or more frequencies substantially coincident with at least one frequency at which the transmitted ultrasonic signals resonate within the first wall, receiving the ultrasonic signals with the sensor units, and processing the received ultrasonic signals to measure the at least one parameter of fluid flow within the internal passage.

7 Claims, 4 Drawing Sheets

U.S. PATENT DOCUMENTS

| | | | |
|---|---|---|---|
| 4,048,853 A | 9/1977 | Smith et al. | |
| 4,080,837 A | 3/1978 | Alexander et al. | |
| 4,195,517 A | 4/1980 | Kalinoski et al. | |
| 4,248,085 A | 2/1981 | Coulthard | |
| 4,320,659 A | 3/1982 | Lynnworth et al. | |
| 4,445,389 A | 5/1984 | Potzick et al. | |
| 4,520,320 A | 5/1985 | Potzick et al. | |
| 4,561,310 A | 12/1985 | Barnard et al. | |
| 4,677,305 A | 6/1987 | Ellinger | |
| 4,717,159 A | 1/1988 | Alston et al. | |
| 4,896,540 A | 1/1990 | Shakkottai et al. | |
| 4,932,262 A | 6/1990 | Wlodarczyk | |
| 5,040,415 A | 8/1991 | Barkhoudarian | |
| 5,060,506 A | 10/1991 | Douglas | |
| 5,083,452 A | 1/1992 | Hope | |
| 5,218,197 A | 6/1993 | Carroll | |
| 5,285,675 A | 2/1994 | Colgate et al. | |
| 5,289,726 A | 3/1994 | Miau et al. | |
| 5,359,897 A | 11/1994 | Hamstead et al. | |
| 5,363,342 A | 11/1994 | Layton et al. | |
| 5,367,911 A | 11/1994 | Jewell et al. | |
| 5,398,542 A | 3/1995 | Vasbinder | |
| 5,524,475 A | 6/1996 | Kolpak et al. | |
| 5,526,844 A | 6/1996 | Kamen et al. | |
| 5,591,922 A | 1/1997 | Segeral et al. | |
| 5,625,140 A | 4/1997 | Cadet et al. | |
| 5,708,211 A | 1/1998 | Jepson et al. | |
| 5,741,980 A | 4/1998 | Hill et al. | |
| 5,770,805 A | 6/1998 | Castel | |
| 5,770,806 A | 6/1998 | Hiismaki | |
| 5,835,884 A | 11/1998 | Brown | |
| 5,845,033 A | 12/1998 | Berthold et al. | |
| 5,856,622 A | 1/1999 | Yamamoto et al. | |
| 5,948,959 A | 9/1999 | Peloquin | |
| 6,016,702 A | 1/2000 | Maron | |
| 6,062,091 A * | 5/2000 | Baumoel | 73/861.27 |
| 6,151,958 A | 11/2000 | Letton et al. | |
| 6,202,494 B1 | 3/2001 | Riebel et al. | |
| 6,233,374 B1 | 5/2001 | Ogle et al. | |
| 6,261,232 B1 | 7/2001 | Yokosawa et al. | |
| 6,293,156 B1 * | 9/2001 | Shen et al. | 73/861.26 |
| 6,345,539 B1 | 2/2002 | Rawes et al. | |
| 6,349,599 B1 | 2/2002 | Lynnworth et al. | |
| 6,354,147 B1 | 3/2002 | Gysling et al. | |
| 6,378,357 B1 | 4/2002 | Han et al. | |
| 6,397,683 B1 | 6/2002 | Hagenmeyer | |
| 6,412,353 B1 | 7/2002 | Kleven et al. | |
| 6,435,030 B1 | 8/2002 | Gysling et al. | |
| 6,442,996 B1 | 9/2002 | Thurston et al. | |
| 6,443,226 B1 | 9/2002 | Diener et al. | |
| 6,450,037 B1 | 9/2002 | McGuinn et al. | |
| 6,463,813 B1 | 10/2002 | Gysling | |
| 6,532,827 B1 | 3/2003 | Ohnishi | |
| 6,536,291 B1 | 3/2003 | Gysling et al. | |
| 6,550,342 B2 | 4/2003 | Croteau et al. | |
| 6,558,036 B2 | 5/2003 | Gysling et al. | |
| 6,587,798 B2 | 7/2003 | Kersey et al. | |
| 6,601,005 B1 | 7/2003 | Eryurek et al. | |
| 6,601,458 B1 | 8/2003 | Gysling et al. | |
| 6,609,069 B2 | 8/2003 | Gysling | |
| 6,626,049 B1 * | 9/2003 | Ao | 73/861.29 |
| 6,658,945 B1 | 12/2003 | Kleven | |
| 6,672,163 B2 | 1/2004 | Han et al. | |
| 6,681,641 B2 * | 1/2004 | Baumoel | 73/861.27 |
| 6,691,584 B2 | 2/2004 | Gysling et al. | |
| 6,698,297 B2 | 3/2004 | Gysling | |
| 6,732,575 B2 | 5/2004 | Gysling et al. | |
| 6,773,603 B2 | 8/2004 | Moorehead et al. | |
| 6,782,150 B2 | 8/2004 | Davis et al. | |
| 6,813,962 B2 | 11/2004 | Gysling et al. | |
| 6,837,098 B2 | 1/2005 | Gysling et al. | |
| 6,837,332 B1 | 1/2005 | Rodney | |
| 6,862,920 B2 | 3/2005 | Gysling et al. | |
| 6,889,562 B2 | 5/2005 | Gysling et al. | |
| 6,898,541 B2 | 5/2005 | Gysling et al. | |
| 6,931,945 B2 * | 8/2005 | Takeda et al. | 73/861.25 |
| 6,971,259 B2 | 12/2005 | Gysling | |
| 6,988,411 B2 | 1/2006 | Gysling et al. | |
| 7,032,432 B2 | 4/2006 | Gysling et al. | |
| 7,509,878 B2 * | 3/2009 | Sato et al. | 73/861.25 |
| 2002/0123852 A1 | 9/2002 | Gysling et al. | |
| 2002/0129662 A1 | 9/2002 | Gysling et al. | |
| 2003/0038231 A1 | 2/2003 | Bryant et al. | |
| 2003/0047007 A1 * | 3/2003 | Baumoel | 73/861.27 |
| 2003/0089161 A1 | 5/2003 | Gysling | |
| 2003/0136186 A1 | 7/2003 | Gysling et al. | |
| 2003/0154036 A1 | 8/2003 | Gysling et al. | |
| 2003/0172743 A1 * | 9/2003 | Ao et al. | 73/861.27 |
| 2004/0006409 A1 | 1/2004 | Liljenberg et al. | |
| 2004/0011141 A1 | 1/2004 | Lynnworth | |
| 2004/0016284 A1 | 1/2004 | Gysling et al. | |
| 2004/0069069 A1 | 4/2004 | Gysling et al. | |
| 2004/0074312 A1 | 4/2004 | Gysling | |
| 2004/0144182 A1 | 7/2004 | Gysling et al. | |
| 2004/0167735 A1 | 8/2004 | Rothman et al. | |
| 2004/0168522 A1 | 9/2004 | Bailey et al. | |
| 2004/0168523 A1 | 9/2004 | Bailey et al. | |
| 2004/0194539 A1 | 10/2004 | Gysling | |
| 2004/0199340 A1 | 10/2004 | Gysling et al. | |
| 2004/0199341 A1 | 10/2004 | Gysling et al. | |
| 2004/0210404 A1 | 10/2004 | Gysling et al. | |
| 2004/0226386 A1 | 11/2004 | Croteau et al. | |
| 2004/0231431 A1 | 11/2004 | Bailey et al. | |
| 2004/0255695 A1 | 12/2004 | Gysling et al. | |
| 2005/0000289 A1 | 1/2005 | Gysling et al. | |
| 2005/0005711 A1 | 1/2005 | Gysling et al. | |
| 2005/0005712 A1 | 1/2005 | Gysling et al. | |
| 2005/0005713 A1 | 1/2005 | Winston et al. | |
| 2005/0005912 A1 | 1/2005 | Gysling et al. | |
| 2005/0011258 A1 | 1/2005 | Gysling et al. | |
| 2005/0011279 A1 * | 1/2005 | Takeda et al. | 73/861.26 |
| 2005/0011283 A1 | 1/2005 | Gysling et al. | |
| 2005/0011284 A1 | 1/2005 | Davis et al. | |
| 2005/0012935 A1 | 1/2005 | Kersey | |
| 2005/0033545 A1 | 2/2005 | Gysling | |
| 2005/0039520 A1 | 2/2005 | Davis et al. | |
| 2005/0044929 A1 | 3/2005 | Gysling et al. | |
| 2005/0044966 A1 | 3/2005 | Gysling et al. | |
| 2005/0050956 A1 | 3/2005 | Gysling et al. | |
| 2005/0061060 A1 | 3/2005 | Banach et al. | |
| 2005/0072216 A1 | 4/2005 | Engel | |
| 2005/0125166 A1 | 6/2005 | Loose et al. | |
| 2005/0125170 A1 | 6/2005 | Gysling et al. | |
| 2005/0171710 A1 | 8/2005 | Gysling et al. | |
| 2008/0060448 A1 * | 3/2008 | Wiest et al. | 73/861.27 |
| 2008/0098824 A1 * | 5/2008 | Bailey et al. | 73/861.27 |

FOREIGN PATENT DOCUMENTS

| | | |
|---|---|---|
| EP | 0290336 | 11/1988 |
| EP | 1186868 | 3/2002 |
| GB | 2210169 | 6/1989 |
| JP | 58048817 A * | 3/1983 |
| WO | WO93/14382 | 7/1993 |
| WO | WO99/067629 | 12/1999 |
| WO | WO 00/00793 | 1/2000 |
| WO | WO 00/46583 | 8/2000 |
| WO | WO 01/02810 | 1/2001 |
| WO | WO 02/50511 | 6/2002 |

| | | |
|---|---|---|
| WO | WO 2004/063741 | 7/2004 |

OTHER PUBLICATIONS

Sonar-Based Volumetric Flow Meter for Chemical and Petrochemical Applications—Daniel L. Gysling & Douglas H. Loose—Feb. 14, 2003.

New Flowmeter Principle—by Walt Boyes—Flow Control Magazine—Oct. 2003 Issue.

Sonar Gets into the Flow—Daniel L. Gysling and Douglas H. Loose—Modern Process—Jan. 2004.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

Harshal B. Nemade, IEEE Transactions on Instrumentation and Measurement, vol. 47, No. 1, Feb. 1998, p. 265-269.

D.O. Thompson and D.E. Chimenti, Non-Intrusive, Ultrasonic Measurement of Fluid Composition, 1998 Abstract.

Active-Time Detection and Ultrasonic Flow-Meter Applications, Morten Willatzen, Peter Sondergaard, Carl Latino, Frands Voss, Niels Lervad Andersen, Martin Brokate, Aicha Bounaim, Journal of Physics, Conference Series 52 (2006 pp. 58-72.

\* cited by examiner

APPARATUS AND METHOD FOR MEASURING A FLUID FLOW PARAMETER WITHIN AN INTERNAL PASSAGE OF AN ELONGATED BODY

Applicant hereby claims priority benefits under 35 U.S.C. §119(e) of U.S. Provisional Patent Application No. 60/858,323 filed Nov. 9, 2006, the disclosure of which is herein incorporated by reference.

FIELD OF THE INVENTION

The present invention pertains to the field of processing ultrasonic signals, and more particularly to apparatus and methods for using ultrasonic signals to measure one or more parameters of a fluid flowing within an internal passage of an elongated body.

BACKGROUND OF THE INVENTION

Flow meters utilizing ultrasonic transducers can be used to sense fluid flow properties such as velocity, volumetric flow rate, etc. Cross correlation ultrasonic flow meters (CCUF), for example, can measure the time required for ultrasonic beams to transit across a flow path at two, axially displaced locations along a pipe. Within this measurement principle, variations in transit time are assumed to correlate with properties that convect with the flow, such as vortical structure, inhomogeneities in flow composition, and temperature variations to name a few.

CCUFs utilize high frequency acoustic signals, i.e. ultrasonics, to measure much lower frequency, time varying properties of structures in the flow. Like all other cross correlation based flow meters, the physical disturbances which cause the transit time variations should retain some level of coherence over the distance between the two sensors. CCUFs are typically much more robust to variations in fluid composition than the other ultrasonic-based flow measurement approaches such as transit time and Doppler based methods.

Transit time, defined as the time required for an ultrasonic beam to propagate a given distance, can be measured using a radially aligned ultrasonic transmitter and receiver. For a homogenous fluid with a no transverse velocity components flowing in an infinitely rigid tube, the transit time is given by the following relation:

$$t = D/A_{mix}$$

where "t" is the transit time, D is the diameter of the pipe, and $A_{mix}$ is the speed of sound propagating through the fluid.

In such a flow, a variation in transit time is analogous to a variation in sound speed of the fluid. In real fluids however, there are many mechanisms, which could cause small variations in transit time which remain spatially coherent for several pipe diameters. For single phase flows, variations in the transverse velocity component will cause variations in transit time. Variations in the thermophysical properties of a fluid such as temperature or composition will also cause variations. Many of these effects convect with the flow. Thus, influence of transverse velocity of the fluid associated with coherent vortical structures on the transit time enables transit time based measurements to be suitable for cross correlation flow measurement for flows with uniform composition properties. The combination of sensitivity to velocity field perturbation and to composition changes make transit time measurement well suited for both single and multiphase applications.

Despite CCUFs functioning over a wide range of flow composition, standard transit time ultrasonic flow meters (TTUF) are more widely used. TTUFs tend to require relatively well behaved fluids (i.e. single phase fluids) and well-defined coupling between the transducer and the fluid itself TTUFs rely on transmitting and receiving ultrasonic signals that have some component of their propagation in line with the flow. While this requirement does not pose a significant issue for in-line, wetted transducer TTUFs, it does pose a challenge for clamp-on devices by introducing the ratio of sound speed in the pipe to the fluid as an important operating parameter. The influence of this parameter leads to reliability and accuracy problems with clamp-on TTUFs.

Signal-to-noise ratio (i.e., the ratio of a desired signal to a noise signal containing no useful information) is very often an issue with flow meters that utilize non-wetted ultrasonic sensors that send and receive signals through the walls of the vessel (e.g., pipe) in which the fluid flow is passing. In addition, differences in material properties between the pipe walls and the fluid flow traveling therein can create impedance mismatches that inhibit signal propagation. Attenuated signals undesirably decrease the signal-to-noise ratio, and likely also decrease the accuracy of information available from the signal. Consequently, it would be desirable to provide a method for improving the strength and quality of a signal produced and received by an ultrasonic sensor unit utilized within a flow meter, and an apparatus operable to do the same.

SUMMARY OF THE INVENTION

It is, therefore, an object of the present invention to provide a method for improving the strength and quality of a signal produced and received by an ultrasonic sensor unit utilized within a flow meter, and an apparatus operable to do the same.

According to the present invention, a method for measuring at least one parameter of a fluid flowing through an internal passage of an elongated body is provided. The internal passage is disposed between a first wall and a second wall, and the first wall and the second wall each include an interior surface and an exterior surface. The method includes the steps of providing an array of at least two ultrasonic sensor units, operating the sensor units to transmit ultrasonic signals at one or more frequencies substantially coincident with at least one frequency at which the transmitted ultrasonic signals resonate within the first wall, receiving the ultrasonic signals with the sensor units, and processing the received ultrasonic signals to measure the at least one parameter of fluid flow within the internal passage.

According to present invention, a method for sensing flow within an internal passage of a pipe is provided. The internal passage is disposed between a first wall of the pipe and a second wall of the pipe. The method includes the steps of providing a flow meter having an array of at least two ultrasonic sensor units, operating the sensor units to transmit ultrasonic signals at one or more frequencies substantially coincident with at least one frequency at which the transmitted ultrasonic signals resonate within the first wall, and receiving the ultrasonic signals with the sensor units.

In some embodiments of the present method, ultrasonic transmitters within the sensor units are pulsed between an active period when ultrasonic signals are transmitted and an inactive period when ultrasonic signals are not transmitted. The active periods each have a duration sufficient to enable the transmitted ultrasonic signals resonating within the first wall to increase in amplitude an amount that readily distinguishes the transmitted ultrasonic signals from signal noise.

In some embodiments, one or more of the sensor units further includes the ability to receive ultrasonic signals transmitted from the transmitter and reflected within the first wall.

This can be accomplished by using a transmitter capable of acting as a receiver, or by using an independent feedback ultrasonic receiver located on the exterior surface of the first wall proximate the transmitter.

According to the present invention, an apparatus for sensing flow within an internal passage of a pipe is provided. The internal passage of the pipe is disposed between a first wall of the pipe and a second wall. The apparatus includes an array of at least two ultrasonic sensor units. Each sensor unit includes an ultrasonic transmitter mountable on an exterior surface of the first wall and an ultrasonic receiver mountable on an exterior surface of the second wall and substantially aligned with the transmitter to receive ultrasonic signals transmitted therefrom. The apparatus further includes a processor adapted to operate the ultrasonic transmitters to transmit ultrasonic signals at one or more frequencies substantially coincident with at least one frequency at which the transmitted ultrasonic signals resonate within the first wall of the pipe, and adapted to receive signals from the ultrasonic receivers.

The foregoing and other objects, features and advantages of the present invention will become more apparent in light of the following detailed description of exemplary embodiments thereof.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
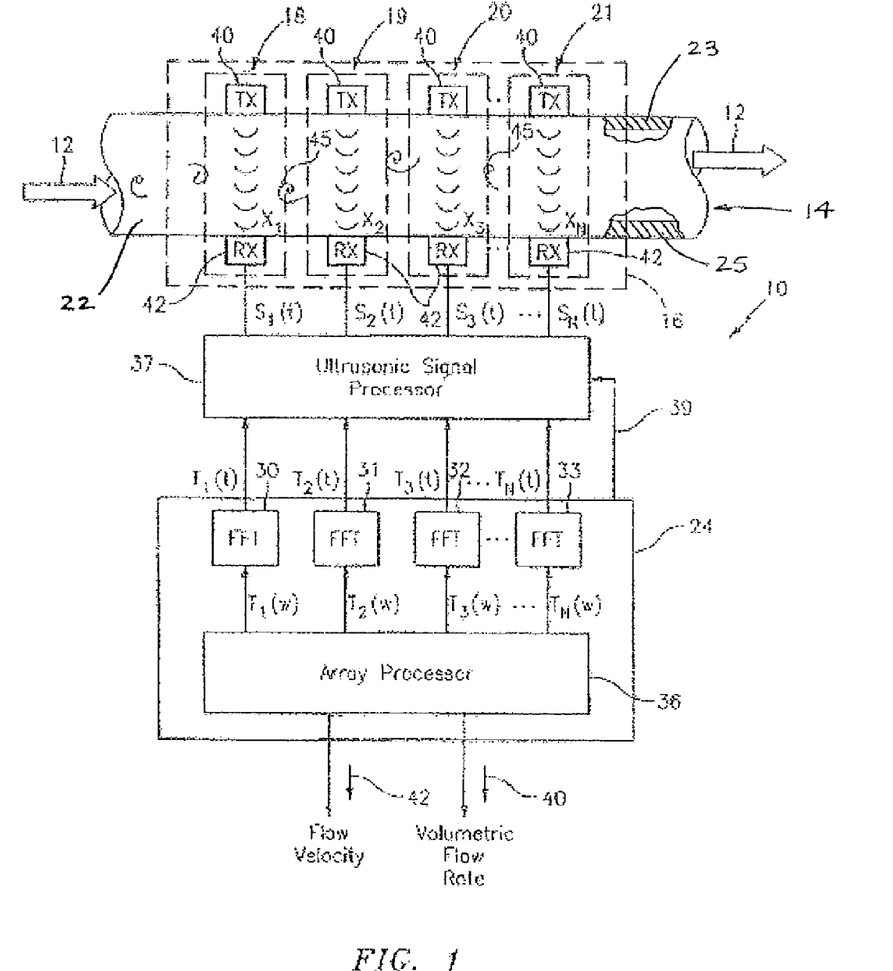
FIG. 1 is a block diagram of a flow meter having an array of ultrasonic sensor units disposed axially along a pipe for measuring the volumetric flow of the fluid flowing in the pipe, in accordance with the present invention.

Referring to FIG. 1, a flow meter, generally shown as 10, is provided to measure the velocity and/or volumetric flow rate of a single phase fluid 12 (e.g., gas, liquid or liquid/liquid mixture) and/or a multi-phase mixture 12 (e.g., process flow) flowing through an elongated body having an internal passage such as a pipe 14. For ease of description, the term "pipe" will be used hereinafter in place of the aforesaid "elongated body". The present invention is not, however, limited to use with circular cross-section pipes, however. The multi-phase mixture may be a two-phase liquid/gas mixture, a solid/gas mixture or a solid/liquid mixture, gas entrained liquid or a three-phase mixture.

The flow meter 10 embodiment shown in FIG. 1 includes a sensing device 16 comprising an array of ultrasonic sensor units 18-21 The array includes at least two ultrasonic sensor units and may have as many as "N" number of ultrasonic sensor units, where "N" is an integer. Each sensor unit comprises a pair of ultrasonic sensors 40, 42, one of which functions as a transmitter (Tx) 40 and the other as a receiver (Rx) 42. The sensor units 18-21 are spaced axially along the outer surface 22 of a pipe 14 having a process flow 12 propagating therein, at locations $x_1, x_2, x_3, \ldots x_N$, respectively. The distances between sensor units should be known or determinable; but do not necessarily have to be uniform. In the embodiment shown in FIG. 1, the pair of sensors 40, 42 within each sensor unit is diametrically disposed on the pipe to provide a through transmission configuration, such that the sensors transmit and receive an ultrasonic signal that propagates through the fluid substantially orthogonal to the direction of the flow of the fluid within the pipe. The ultrasonic sensors 18-21 are clamped onto, or are otherwise attached to, the outer surface 22 of the pipe 14. The embodiment shown in FIG. 1 diagrammatically shows transmitters 40 attached to a first wall portion 23 of the pipe 14 and the receivers 42 diametrically disposed and attached to a second wall portion 25 of the pipe 14. Externally attached sensor units 18-21 may be referred to as "non-wetted", as opposed to "wetted" sensor units which are in direct contact with the process flow.

Figure 2:
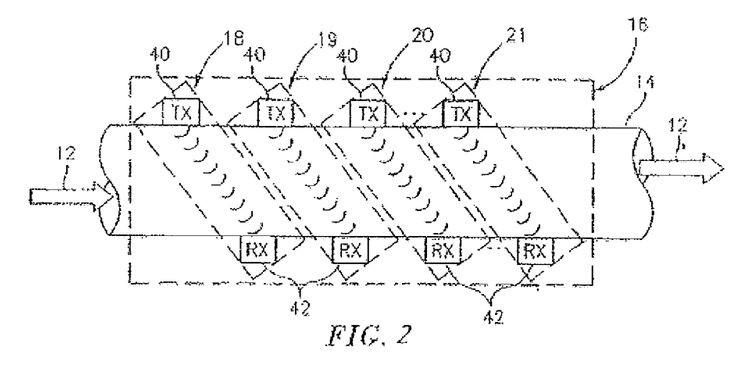
FIG. 2 is a block diagram of an alternative embodiment of a sensing device of a flow meter embodying the present invention similar to that shown in FIG. 1.

FIG. 2 illustrates an alternative sensor arrangement wherein the transmitter (Tx) 40 and receiver (Rx) 42 of each sensor unit 18-21 may be offset axially such that the ultrasonic signal from the transmitter sensor has an axial component in its propagation direction, as shown in FIG. 2. Although diametrically disposed sensors 40, 42 are preferred, the sensors 40, 42 may alternatively simply oppose each other on the pipe. In addition, the sensor units 18-21 may be at different radial location on the pipe compared to each other.

Referring back to FIG. 1, each pair of ultrasonic sensors 40, 42 is operable to measure a transit time (i.e., time of flight (TOF), or phase modulation) of an ultrasonic signal propagating through the process flow 12 from the transmitting sensor 40 to the receiving sensor 42. The transit time measurement or variation is indicative of a coherent property that convects with the flow 12 within the pipe (e.g., vortical disturbances, inhomogeneities within the flow, temperature variations, bubbles, particles, pressure disturbances), which are indicative of the velocity of the process flow 12. The ultrasonic sensors may operate at practically any frequency. It has been found, however, that higher frequency sensors are more suitable for single phase fluids and lower frequency sensors are more suitable for multiphase fluids. The optimum frequency of the ultrasonic sensor is therefore related to the size or type of particle or substance propagating with the flow 12, and is also related to resonant frequencies of the pipe as will be discussed below. Examples of frequency used for a flow meter embodying the present invention are 1 MHz and 5 MHz. The ultrasonic sensors may provide a pulsed, chirped or continuous signal through the process flow 12. An example of a sensor 40, 42 that may be used is Model no. 113-241-591, manufactured by Krautkramer.

The ultrasonic signals injected into the pipe 14 can, if tuned properly, create a resonant response within one or both walls 23, 25 of the pipe 14. The resonant response amplifies the ultrasonic signal as it passes through the first wall 23, thereby increasing the ultrasonic signal entering the flow within the pipe 14. Likewise, the ultrasonic signal entering the second wall 25 of the pipe 14 from the flow 12 may also be amplified by the resonant response within the second wall 25, thereby increasing the ultrasonic signal to be sensed by the receiver. As a result, the signal-to-noise ratio of the sensor unit is improved.

Figure 4:
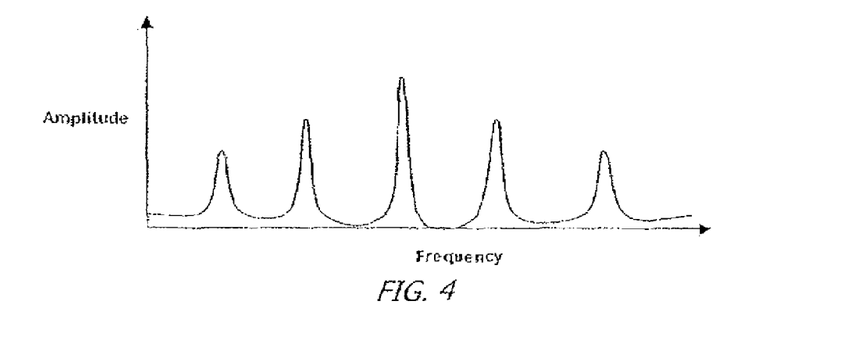
FIG. 4 is a frequency-amplitude graph showing transmitted spectra, with high peaks in amplitude representing resonant conditions.

The tuning of the sensor Units 18-21 to produce an ultrasonic frequency operable to create a resonant response within a pipe system can be done in a variety of different ways; e.g., by initially collecting empirical data from a similar type pipe system or the actual pipe system itself or the tuning can be done in real-time during use of the flow meter. For example, the drive frequency of the transmitter can be slowly adjusted to maximize the through signal, and the relevant frequency(ies) identified. The sensor units may be fine tuned by using a dithering technique as is described below. FIG. 4 shows an amplitude-frequency plot of a pipe system subjected excitation frequencies, where the high peaks indicate resonant conditions.

Figure 6:
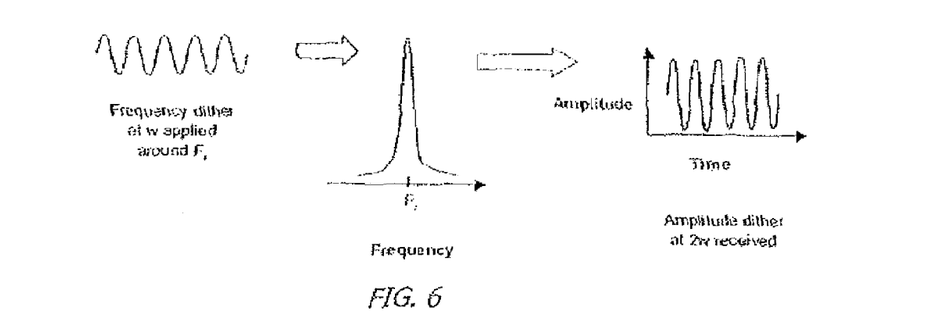
FIG. 6 is diagrammatic representation illustrating the application of a signal monitoring technique wherein a dither at a frequency of w is applied to a fundamental resonance frequency $F_r$.

Once an ultrasonic frequency operable to create a resonant response within the pipe (i.e., a fundamental resonance frequency) is selected, the signal received by the receiver 42 of each sensor unit 18-21 can be periodically or continuously monitored to evaluate whether the received signal intensity is optimal. Changes in signal intensity can occur due to factors such as temperature induced frequency shifts in the pipe system, frequency changes within the driving electronics, etc. One method for monitoring the resonant condition (i.e., tuning the injected frequency to the resonance condition), is to put a slight dither on the fundamental resonance frequency ($F_r$) as is illustrated in FIG. 6. A dither with a frequency of w will induce an amplitude modulation of $2\omega$ at the received signal as the dither traverses the peak of the resonance waveform. The receiving electronics can then bandpass filter on the $2\omega$ signal and feed a correction signal to the transmitting electronics to optimize the $2\omega$ component. Dithering represents an exemplary technique for monitoring and optimizing the signal received by the receiver, but is not the only such technique that can be used with the present invention. For example, other techniques include introducing an oscillation to help optimize the injected frequency for maximum signal, which maximum signal helps correlate the received signal from noise within the system.

Figure 1A:
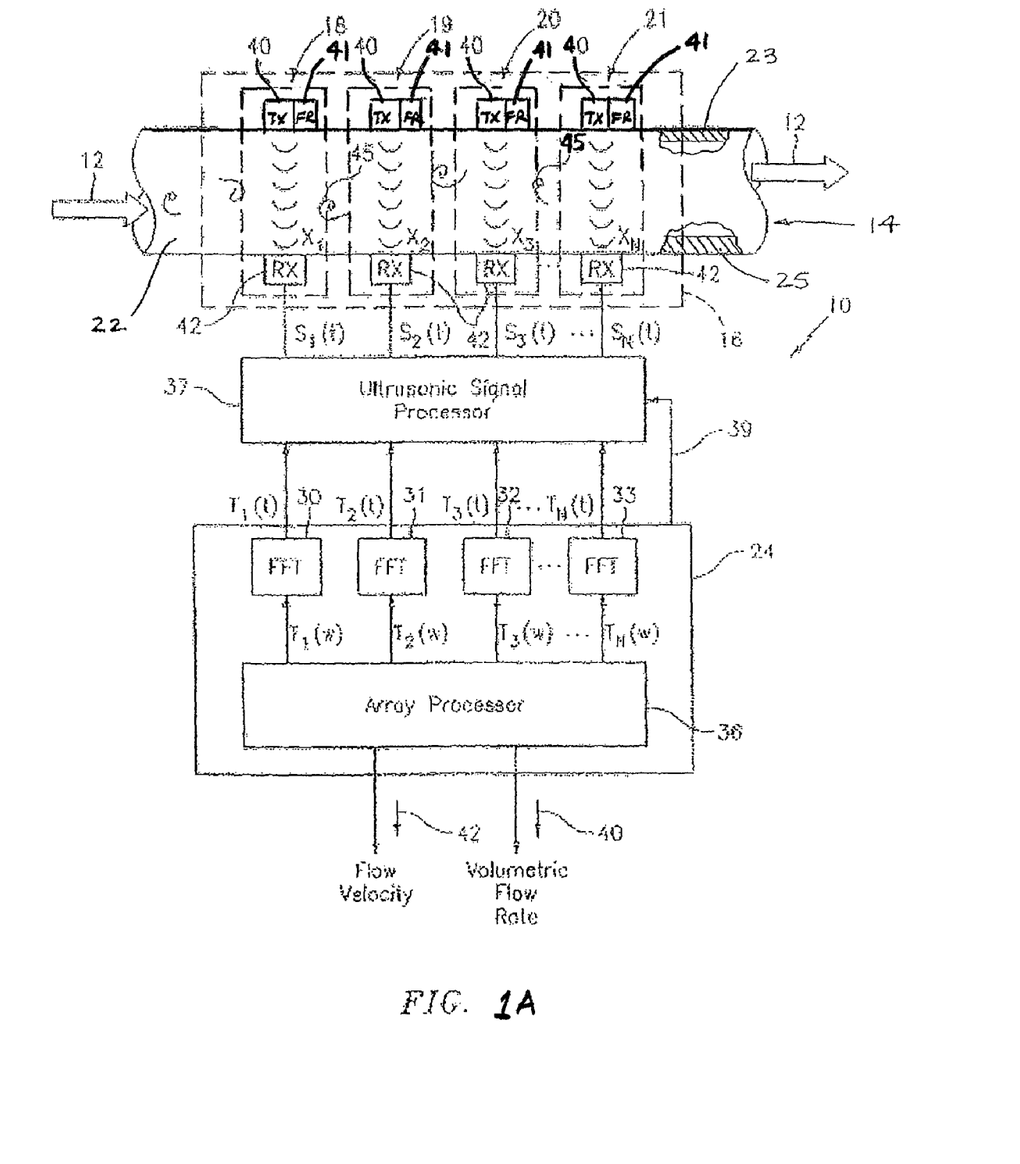
FIG. 1A is the same block diagram as that shown in FIG. 1, with the exception that independent feedback receivers are included.
Figure 5:
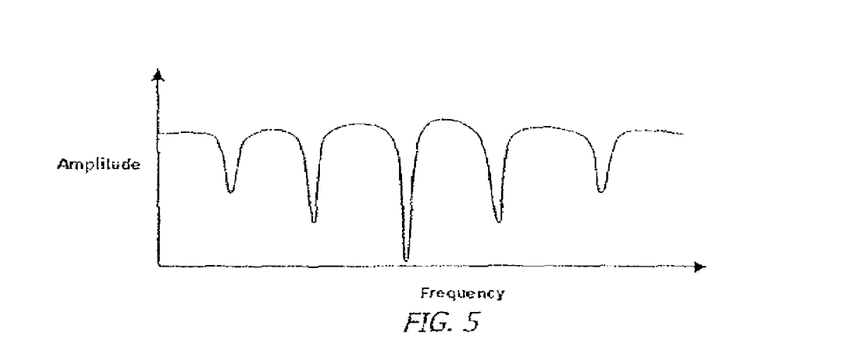
FIG. 5 is a frequency-amplitude graph showing reflected spectra, with sharp valleys in amplitude representing resonant conditions.

In an alternative embodiment, monitoring of the resonant condition can be accomplished by sensing signal spectra reflected within the first wall of the pipe. The monitoring can be performed by the transmitter acting as a receiver, or it can be performed using an independent feedback receiver 41 (see FIG. 1A) located proximate the transmitter 40 in each sensor unit 18-21. In this embodiment, the feedback receiver monitors signal spectra reflected within the first wall of the pipe. A processor 37 (see below) is adapted to receive signals from the feedback ultrasonic receiver representative of the ultrasonic signals reflected within the first wall, and identify a minimum reflected signal indicative of the resonant condition. FIG. 5 shows a diagrammatic plot of spectra reflected within the first wall. The deep valleys represent minimum reflected signals indicative of resonant conditions within the pipe, where the majority of the energy is transmitted through rather than reflected back. In this case, the preferred operation point of the sensor unit 18-21 would be the frequency associated with the minimum (i.e., deep valley). As indicated above, the performance of the sensor unit can be monitored using techniques such as dithering.

In addition to improving the performance of the sensor unit 18-21 by finding and using a resonant condition, the present invention also includes improving the performance of the sensor unit by determining a preferred transmitter pulse duration for a sensor unit 18-21. The above-described resonant response builds in intensity within the wall 23, 25 for a period of time, beginning when the fundamental response frequency is first introduced into the pipe wall 23, 25. The resonant response will reach a maximum intensity (i.e., the transmitted signal reaching a maximum amplitude) after a period of time, at which point dampening within the pipe system prevents any further increase in intensity. The period of time from start to maximum intensity represents a preferred pulse duration for the injected signal. Less than the preferred pulse duration results in a less than optimum signal amplification, and more than the preferred pulse duration results in no more than the optimum signal amplification. The preferred pulse duration will likely vary from system to system due to factors such as pipe wall thickness, material, operating temperature, etc., and can be determined by tuning the system prior to using it, or the tuning can be done in real time while the system is in use, or a combination of both.

An ultrasonic signal processor 37 fires the transmitter sensors 40 in response to a firing signal 39 from a processor 24 and receives the ultrasonic output signals $S_1(t)$–$S_N(t)$ from the receiver sensors 42. The signal processor 37 processes the data from each of the sensor units 18-21 to provide an analog or digital output signal $T_1(t)$–$TN(t)$ indicative of the time of flight or transit time of the ultrasonic signal through the process flow 12. The signal processor 37 may also provide an output signal indicative of the amplitude (or attenuation) of the ultrasonic signals. One such signal processor is model number USPC 2100 manufactured by Krautkramer Ultrasonic Systems. Measuring the amplitude of ultrasonic signal is particularly useful and works well for measuring the velocity of a fluid that includes a substance in the flow (e.g., multiphase fluid or slurry).

The output signals ($T_1(t)$–$TN(t)$) of the ultrasonic signal processor 37 are provided to the processor 24, which processes the transit time measurement data to determine a parameter such as the volumetric flow rate of the process flow. The transit time or time of flight measurement is defined by the time it takes for an ultrasonic signal to propagate from the transmitting sensor 40 to the respective receiving sensor 42 through the pipe wall and the process flow 12. The effect of the vortical disturbances (and/or other inhomogeneities within the fluid) on the transit time of the ultrasonic signal is to delay or speed up the transit time. Therefore, each sensing unit 18-21 provides a respective output signal $T_1(t)$–$TN(t)$ indicative of the variations in the transit time of the ultrasonic signals propagating orthogonal to the direction of the process flow 12. The transit time measurement is derived by interpreting the convecting coherent property and/or characteristic within the process piping using at least two sensor units 18, 19.

In one example, the flow meter 10 measures the volumetric flow rate by determining the velocity of vortical disturbances 45 (e.g., coherent structures such as "turbulent eddies"; see FIG. 2) propagating with the flow 12 using the array of ultrasonic sensors 18-21. Coherent structures 45 are an inherent feature of turbulent boundary layers present in all turbulent flows. The ultrasonic sensor units 18-21 measure the transmit time $T_1(t)$–$TN(t)$ of the respective ultrasonic signals between each respective pair of sensors 40, 42, which varies due to the vortical disturbances as these disturbances convect within the flow 12 through the pipe 14 in a known manner. Therefore, the velocity of these vortical disturbances is related to the velocity of the process flow 12 and hence the volumetric flow rate may be determined. The volumetric flow rate may be determined by multiplying the velocity of the process flow 12 by the cross-sectional area of the pipe.

The overwhelming majority of industrial process flows 12 involve turbulent flow. Turbulent fluctuations within the process flow 12 govern many of the flow properties of practical interest including the pressure drop, heat transfer, and mixing. For engineering applications, considering only the time-averaged properties of turbulent flows is often sufficient for design purposes. For sonar based array processing flow metering technology, understanding the time-averaged velocity profile in turbulent flow 12 provides a means to interpret the relationship between speed at which coherent structures 45 convect and the volumetrically averaged flow rate.

Turbulent pipe flows 12 are highly complex flows. Predicting the details of any turbulent flow is problematic, although much is known regarding the statistical properties of the flow. For instance, as indicated above, turbulent flows contain self-generating, coherent vortical structures such as "turbulent eddies" 45. The maximum length scale of coherent structures 45 is set by the diameter of the pipe 14. These structures 45 remain coherent for several pipe diameters downstream, eventually breaking down into progressively smaller structures until the energy is dissipated by viscous effects.

Figure 3:
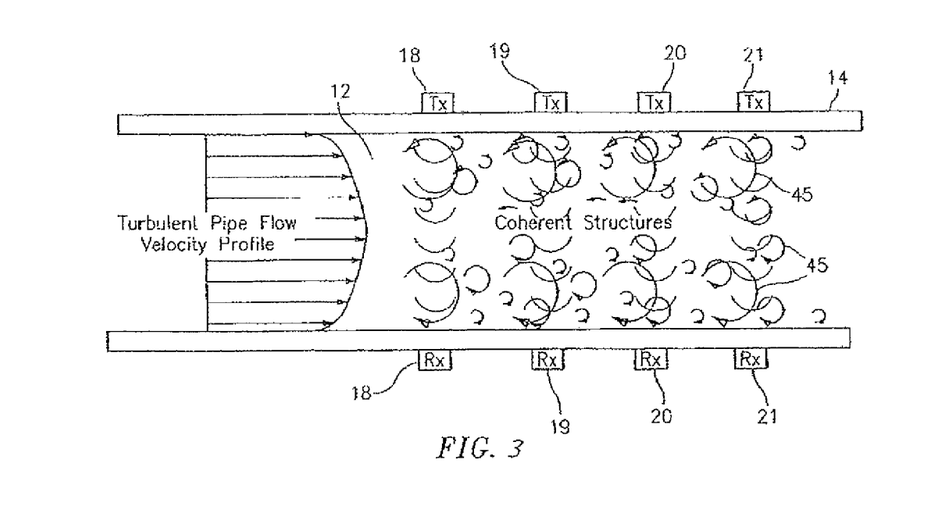
FIG. 3 is a cross-sectional view of a pipe having a turbulent pipe flowing having coherent structures therein, in accordance with the present invention.

FIG. 3 diagrammatically illustrates the relevant flow features of turbulent pipe flow 12 along with an axial array of ultrasonic sensor units 18-21, each sensor unit having a transmitter unit 40 and a receiver unit 42. As shown, the time-averaged axial velocity is a function of radial position, from zero at the wall to a maximum at the centerline of the pipe. The flow 12 near the wall is characterized by steep velocity gradients and transitions to relatively uniform core flow near the center of the pipe 14. Vortical structures (e.g., "turbulent eddies") are superimposed over the time averaged velocity profile. These coherent structures contain temporally and spatially random fluctuations with magnitudes typically less than ten percent (10%) of the mean flow velocity and are carried along with the mean flow. Experimental investigations have established that turbulent eddies 45 generated within turbulent boundary layers remain coherent for several pipe diameters and convect at roughly eighty percent (80%) of maximum flow velocity (Schlichting, 1979).

The ultrasonic sensors provide transit time-varying signals $T_1(t)$, $T_2(t)$, $T_3(t)$, $T_N(t)$ to the signal processor 24 to known Fast Fourier Transform (FFT) logics 30-33, respectively. The FFT logics 30-33 calculate the Fourier transform of the time-based input signals $T_1(t)-T_N(t)$ and provide complex frequency domain (or frequency based) signals $T_1\omega$, $T_2\omega$, $T_3\omega$, $T_N\omega$ indicative of the frequency content of the input signals. Techniques other than FFTs can be used to obtain the frequency domain characteristics of the signals $T_1(t)-T_N(t)$. The frequency signals $T_1\omega-T_N\omega$ are fed to an array processor 36, which provides a flow signal 40 indicative of the volumetric flow rate of the process flow 12 and a velocity signal 42 indicative of the velocity of the process flow.

One technique of determining the convection velocity of the vortical disturbances within the process flow 12 involves characterizing the convective ridge of the vortical disturbances using an array of unsteady ultrasonic sensors or other beam forming techniques, similar to that shown in U.S. patent application Ser. No. 09/729,994, filed Dec. 4, 2000, entitled "Method and Apparatus for Determining the Flow Velocity Within a Pipe", which is incorporated herein by reference.

The flow metering methodology uses the convection velocity of coherent structure with turbulent pipe flows 12 to determine the volumetric flow rate. The convection velocity of these turbulent eddies 45 is determined by applying array processing techniques to determine the speed at which the eddies convect past the axial ultrasonic sensor array distributed along the pipe 14, similar to that used in the radar and sonar fields. U. S. Patent Application Publication No. US 2004/0199340, published Oct. 7, 2004, which is hereby incorporated by reference in its entirety, discloses an example of an acceptable array processing technique. The prior art teaches many sensor array processing techniques, however, and the present invention is not restricted to any particular technique.

While the present invention describes a flow meter having an array of ultrasonic meters to measure the velocity of the vortical disturbances within the flow 12, the present invention contemplates that the ultrasonic sensors 18-21 measures any property and/or characteristic of the flow 12 that convects with the flow (e.g., vortical disturbances, inhomogeneities within the flow, temperature variations, acoustic wave variations propagating within the pipe, bubbles, particles, pressure disturbances)

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof the foregoing and various other additions and omissions may be made therein and thereto without departing from the spirit and scope of the present invention. It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A method for measuring at least one parameter of a fluid flowing through an internal passage of an elongated body, which internal passage is disposed between a first wall and a second wall, and the first wall and the second wall each include an interior surface and an exterior surface, the method comprising:

providing an array of at least two ultrasonic sensor units, each sensor unit including an ultrasonic transmitter mounted on the exterior surface of the first wall and an ultrasonic receiver located on the exterior surface of the second wall and substantially aligned with the transmitter;

wherein each sensor unit further includes a feedback ultrasonic receiver located on the exterior surface of the first wall, and each feedback receiver is operable to receive ultrasonic signals transmitted from the transmitter and reflected within the first wall;

operating the ultrasonic transmitters to transmit ultrasonic signals through the first wall, at one or more frequencies substantially coincident with at least one frequency at which the transmitted ultrasonic signals resonate within the first wall, in a manner that increases a signal-to-noise ratio of the ultrasonic signals by using resonance of the ultrasonic signals within the first wall to increase the amplitude of the ultrasonic signals traveling through the first wall, and thereby increase the amplitude of the ultrasonic signals transmitted into the internal passage;

receiving the ultrasonic signals with the ultrasonic receivers; and processing the received ultrasonic signals to measure the at least one parameter of fluid flow within the internal passage.

2. The method of claim 1, wherein the transmitter operates as the feedback ultrasonic receiver.

3. The method of claim 1, wherein the feedback ultrasonic receiver is independent of the transmitter.

4. A method for sensing flow within an internal passage of a pipe, which passage is disposed between a first wall of the pipe and a second wall of the pipe, the method comprising:
- providing a flow meter having an array of at least two ultrasonic sensor units, each sensor unit including an ultrasonic transmitter mounted on an exterior surface of the first wall and an ultrasonic receiver located on an exterior surface of the second wall and substantially aligned with the transmitter;
- wherein each sensor unit further includes a feedback ultrasonic receiver located on the exterior surface of the first wall, and each feedback receiver is operable to receive ultrasonic signals transmitted from the transmitter and reflected within the first wall;
- operating the ultrasonic transmitters to transmit ultrasonic signals through the first wall, at one or more frequencies substantially coincident with at least one frequency at which the transmitted ultrasonic signals resonate within the first wall, in a manner that increases a signal-to-noise ratio of the ultrasonic signals by using resonance of the ultrasonic signals within the first wall to increase the amplitude of the ultrasonic signals traveling through the first wall, and thereby increase the amplitude of the ultrasonic signals transmitted into the internal passage; and
- receiving the ultrasonic signals with the ultrasonic receivers.

5. The method of claim 4, wherein the transmitter operates as the feedback ultrasonic receiver.

6. An apparatus for sensing flow within an internal passage of a pipe, which passage is disposed between a first wall of the pipe and a second wall of the pipe, the apparatus comprising:
- an array of at least two ultrasonic sensor units, each sensor unit including an ultrasonic transmitter mounted on an exterior surface of the first wall and an ultrasonic receiver located on an exterior surface of the second wall and substantially aligned with the transmitter to receive ultrasonic signals transmitted therefrom; and
- a processor adapted to operate the ultrasonic transmitters to transmit ultrasonic signals through the first wall at one or more frequencies substantially coincident with at least one frequency at which the transmitted ultrasonic signals resonate within the first wall of the pipe, in a manner that increases a signal-to-noise ratio of the ultrasonic signals by using resonance of the ultrasonic signals within the first wall to increase the amplitude of the ultrasonic signals traveling through the first wall, and thereby increase the amplitude of the ultrasonic signals transmitted into the internal passage, and adapted to receive signals from the ultrasonic receivers;
- wherein each sensor unit further includes a feedback ultrasonic receiver located on the exterior surface of the first wall, and each feedback receiver is operable to receive ultrasonic signals transmitted from the transmitter and reflected within the first wall.

7. The apparatus of claim 6, wherein the processor is adapted to receive signals from the feedback ultrasonic receiver representative of the ultrasonic signals reflected within the first wall, and identify a minimum reflected signal indicative of the resonant condition.

* * * * *